(12) United States Patent
Clark et al.

(10) Patent No.: US 11,125,096 B2
(45) Date of Patent: Sep. 21, 2021

(54) CMC BOAS ARRANGEMENT

(71) Applicant: United Technologies Corporation, Farmington, CT (US)

(72) Inventors: Thomas E. Clark, Sanford, ME (US); William M. Barker, North Andover, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 140 days.

(21) Appl. No.: 16/402,595

(22) Filed: May 3, 2019

(65) Prior Publication Data

US 2020/0347740 A1 Nov. 5, 2020

(51) Int. Cl.
*F01D 11/08* (2006.01)
*F01D 25/24* (2006.01)

(52) U.S. Cl.
CPC .............. *F01D 11/08* (2013.01); *F01D 25/24* (2013.01); *F05D 2240/14* (2013.01); *F05D 2240/55* (2013.01); *F05D 2240/56* (2013.01); *F05D 2300/6033* (2013.01)

(58) Field of Classification Search
CPC ........... F01D 11/08; F01D 11/122–127; F05D 2240/11
See application file for complete search history.

(56) References Cited

U.S. PATENT DOCUMENTS

| | | | | |
|---|---|---|---|---|
| 5,074,748 A * | 12/1991 | Hagle | ..................... | F01D 9/023 415/170.1 |
| 7,052,235 B2 * | 5/2006 | Alford | ..................... | F01D 9/04 415/173.1 |
| 9,079,245 B2 * | 7/2015 | Durocher | ................ | C22C 19/03 |
| 9,863,264 B2 * | 1/2018 | Kulkarni | ............... | F01D 25/246 |
| 9,945,243 B2 * | 4/2018 | O'Leary | ................. | F01D 11/16 |
| 9,945,256 B2 * | 4/2018 | Freeman | ................ | F01D 11/12 |
| 10,138,750 B2 * | 11/2018 | McCaffrey | ............... | F01D 5/02 |
| 10,563,531 B2 * | 2/2020 | McCaffrey | ........... | F01D 11/005 |
| 10,683,770 B2 * | 6/2020 | Freeman | ................ | F01D 5/284 |

(Continued)

FOREIGN PATENT DOCUMENTS

| | | |
|---|---|---|
| EP | 1362983 | 11/2003 |
| EP | 2960440 | 12/2015 |
| EP | 3219933 | 9/2017 |

OTHER PUBLICATIONS

The Extended European Search Report for EP Application No. 20171479.7 dated Oct. 1, 2020.

*Primary Examiner* — Igor Kershteyn
*Assistant Examiner* — Topaz L. Elliott
(74) *Attorney, Agent, or Firm* — Carlson, Gaskey & Olds, P.C.

(57) ABSTRACT

A blade outer air seal assembly includes a blade outer air seal that has a plurality of seal segments that extend circumferentially about an axis and mounted in a support structure via a carrier. Each of the seal segments has a base portion that extends between a first circumferential side and a second circumferential side and from a first axial side to a second axial side. A first and second hook extend along the base portion in an axial direction. The first and second hooks are engaged with the carrier. The carrier has a wall forward or aft of the first and second hooks and extends radially inward of the first and second hooks.

18 Claims, 7 Drawing Sheets

(56) References Cited

U.S. PATENT DOCUMENTS

| | | | |
|---|---|---|---|
| 2003/0215328 A1* | 11/2003 | McGrath | F01D 25/246 415/173.3 |
| 2005/0067788 A1* | 3/2005 | Liang | F01D 11/005 277/409 |
| 2008/0159850 A1* | 7/2008 | Tholen | F01D 11/08 415/139 |
| 2014/0161596 A1* | 6/2014 | Kulkarni | F01D 11/08 415/173.1 |
| 2015/0377035 A1* | 12/2015 | Freeman | F01D 25/246 416/191 |
| 2015/0377050 A1* | 12/2015 | Freeman | F01D 11/005 416/185 |
| 2016/0146053 A1* | 5/2016 | McCaffrey | F01D 25/24 415/173.1 |
| 2016/0245102 A1* | 8/2016 | Freeman | F01D 11/005 |
| 2016/0245108 A1* | 8/2016 | Sippel | F16J 15/44 |
| 2017/0145860 A1* | 5/2017 | Shapiro | F01D 25/246 |
| 2017/0268371 A1* | 9/2017 | McCaffrey | F02C 7/28 |
| 2017/0306781 A1* | 10/2017 | Lewis | F01D 11/08 |
| 2018/0230839 A1 | 8/2018 | Gallier et al. | |
| 2018/0238193 A1 | 8/2018 | Baucco | |
| 2018/0340440 A1* | 11/2018 | Freeman | F01D 9/042 |
| 2018/0363476 A1* | 12/2018 | Hafner | F01D 5/288 |
| 2019/0048736 A1* | 2/2019 | McCaffrey | F02C 7/28 |
| 2020/0116039 A1* | 4/2020 | Johnson | F01D 25/246 |
| 2020/0325789 A1* | 10/2020 | Clark | F01D 25/246 |

\* cited by examiner

CMC BOAS ARRANGEMENT

BACKGROUND

This application relates to a ceramic matrix composite blade outer air seal assembly.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Blade outer air seals have been proposed made of ceramic matrix composite fiber layers.

SUMMARY

In one exemplary embodiment, a blade outer air seal assembly includes a blade outer air seal that has a plurality of seal segments that extend circumferentially about an axis and mounted in a support structure via a carrier. Each of the seal segments has a base portion that extends between a first circumferential side and a second circumferential side and from a first axial side to a second axial side. A first and second hook extend along the base portion in an axial direction. The first and second hooks are engaged with the carrier. The carrier has a wall forward or aft of the first and second hooks and extends radially inward of the first and second hooks.

In a further embodiment of the above, the wall extends circumferentially between the first and second hooks.

In a further embodiment of any of the above, the first circumferential side has a protrusion or a groove configured to mate with the second circumferential side of an adjacent seal segment.

In a further embodiment of any of the above, the first circumferential side has a protrusion and the second circumferential side has a groove.

In a further embodiment of any of the above, a rope seal is arranged between each of the plurality of seal segments.

In a further embodiment of any of the above, a first edge of the first circumferential side and a second edge of the second circumferential side are angled relative to the radial direction.

In a further embodiment of any of the above, the first and second edges have an angle between about 5° and 45°.

In a further embodiment of any of the above, the base portion extends axially forward and aft of the first and second hooks.

In a further embodiment of any of the above, a radial brush seal is arranged at a leading edge of the blade outer air seal.

In a further embodiment of any of the above, the wall is arranged between the radial brush seal and the first and second hooks.

In a further embodiment of any of the above, a radial brush seal is arranged at a trailing edge of the blade outer air seal.

In a further embodiment of any of the above, the wall is forward of the first and second hooks.

In a further embodiment of any of the above, the carrier includes first and second carrier hooks engaged with the first and second hooks.

In a further embodiment of any of the above, the carrier comprises a plurality of carrier segments arranged circumferentially about the axis.

In a further embodiment of any of the above, there are fewer carrier segments than seal segments.

In a further embodiment of any of the above, the carrier is a metallic material.

In a further embodiment of any of the above, the blade outer air seal is a ceramic material.

In another exemplary embodiment, a turbine section for a gas turbine engine includes a turbine blade that extends radially outwardly to a radially outer tip and for rotation about an axis of rotation. A blade outer air seal has a plurality of segments mounted in a support structure via a carrier. The plurality of segments are arranged circumferentially about the axis of rotation and radially outward of the outer tip. At least one seal segment has a base portion that extends between a first circumferential side and a second circumferential side and from a first axial side to a second axial side. A first hook extends from the base portion and is circumferentially spaced from a second hook. The first and second hooks extend along an axial length of the base portion. The first circumferential side has one of a protrusion and a groove. The first circumferential side is configured to mate with the second circumferential side of an adjacent seal segment. The carrier has a circumferential wall that extends radially inward of the first and second hooks.

In a further embodiment of any of the above the carrier is a metallic material.

In a further embodiment of any of the above the blade outer air seal is a ceramic material.

DETAILED DESCRIPTION

Figure 1:
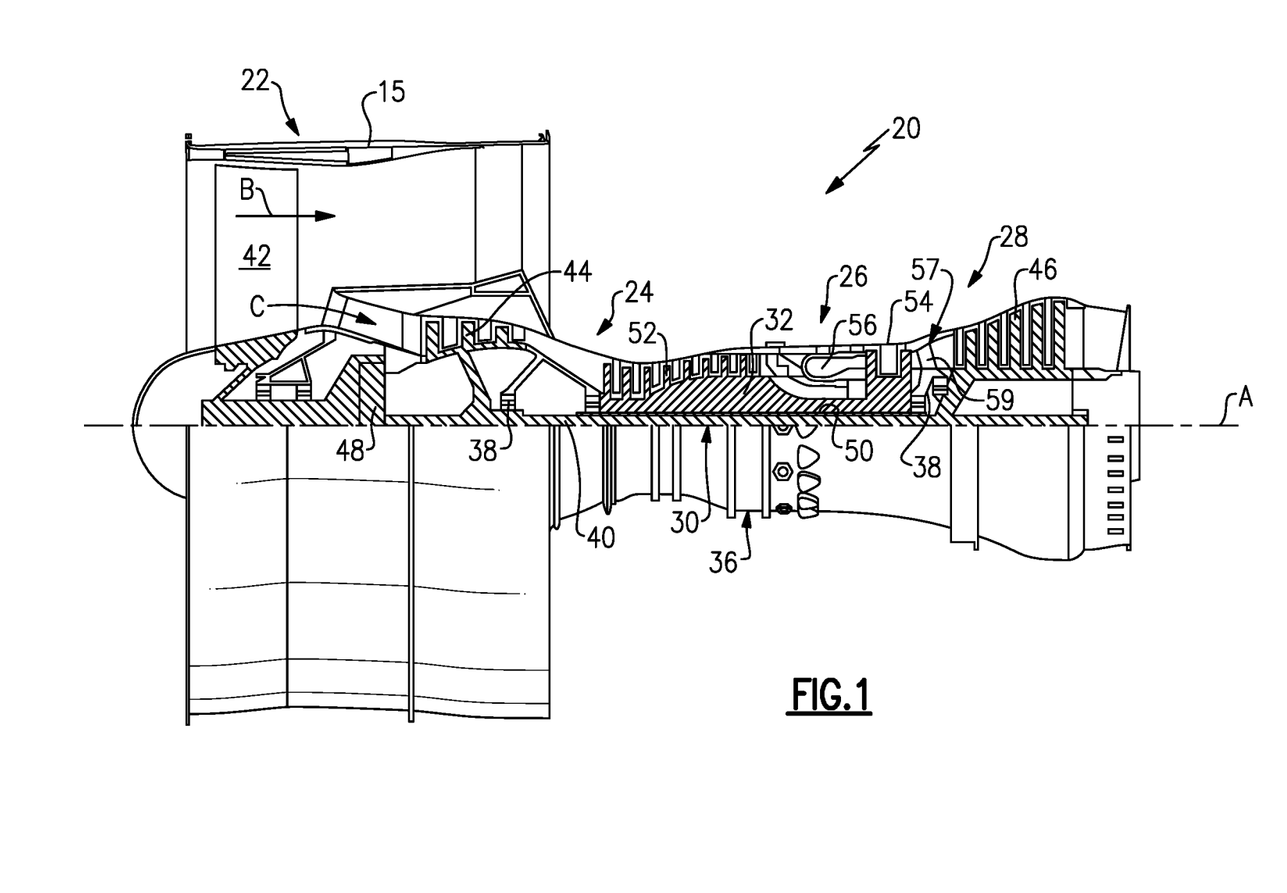
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine engine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram} \ °\text{R})/(518.7° \ \text{R})]^{0.5}$. The "Low corrected fan tip speed" as disclosed herein according to one non-limiting embodiment is less than about 1150 ft/second (350.5 meters/second).

Figure 2:
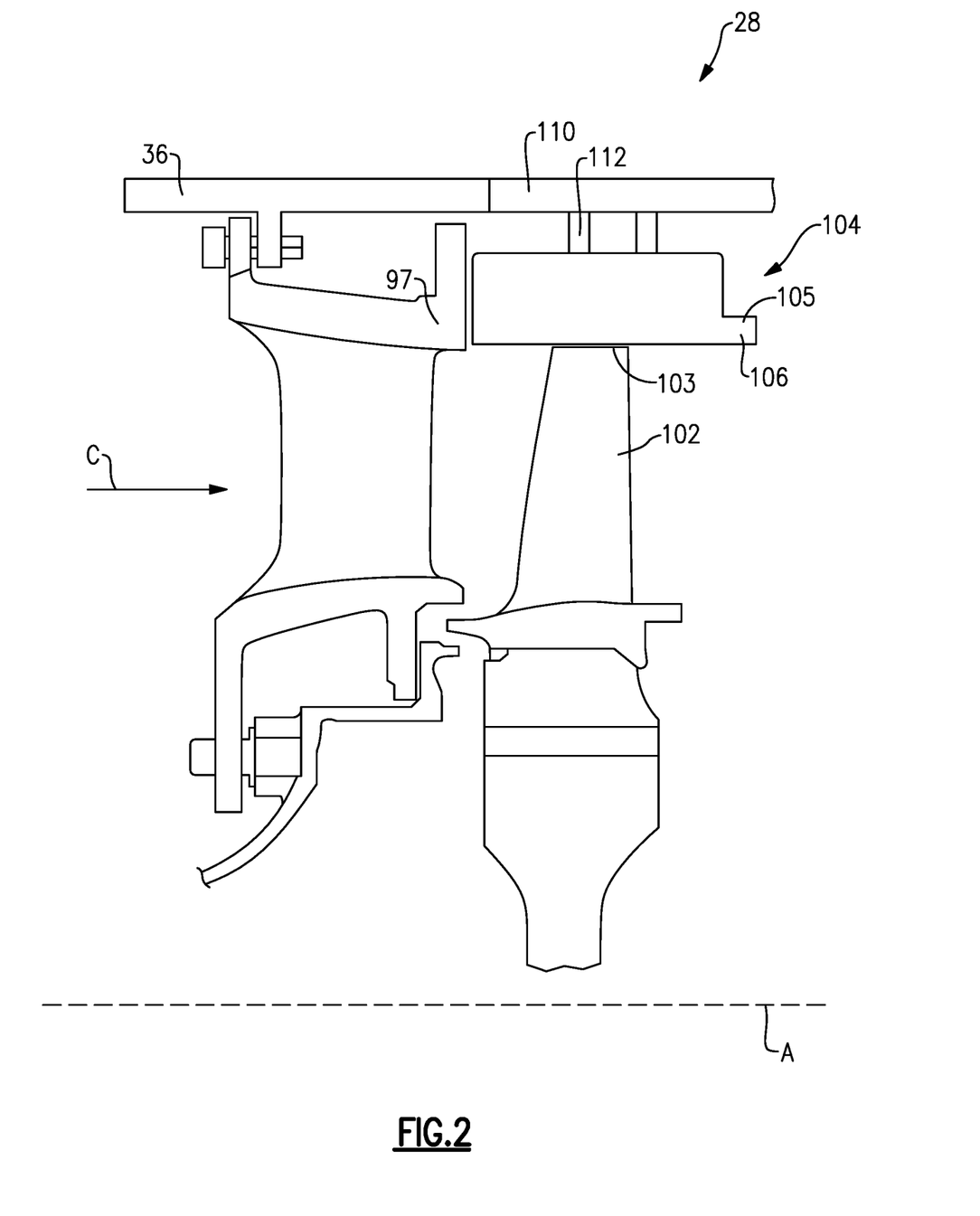
FIG. 2 schematically shows an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The turbine section 28 includes a plurality of alternating turbine blades 102 and turbine vanes 97.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20. The BOAS segments 105 may be monolithic bodies that are formed of a high thermal-resistance, low-toughness material, such as a ceramic matrix composite ("CMC").

The BOAS 106 may be mounted to an engine case or structure, such as engine static structure 36 via a control ring or support structure 110 and a carrier 112. The engine structure 36 may extend for a full 360° about the engine axis A. The engine structure 36 may support the support structure 110 via a hook or other attachment means. The engine case or support structure holds the BOAS 106 radially outward of the turbine blades 102.

Figure 3:
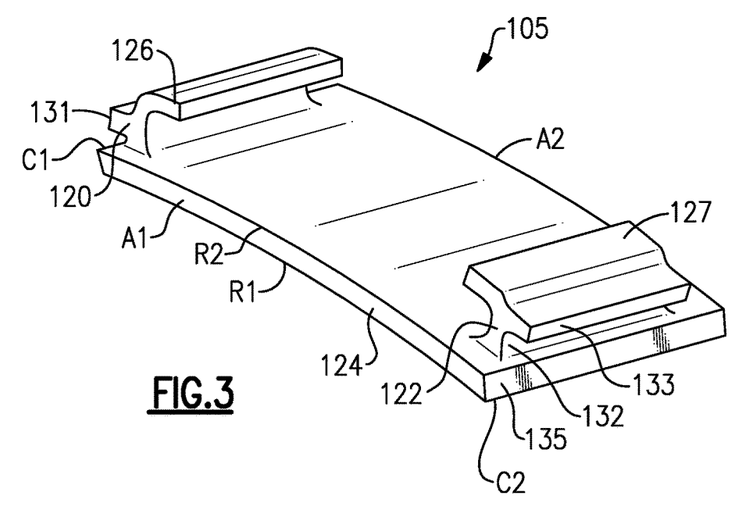
FIG. 3 shows an exemplary blade outer air seal.

FIG. 3 shows an exemplary BOAS seal segment 105. Each seal segment 105 is a body that defines radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In the illustrated example, each BOAS segment 105 includes a first wall 120 and a second wall 122 that extend radially outward from a base portion 124. The first and second walls 120, 122 extend along the base portion 124 in a generally axial direction, and are circumferentially spaced from one another. The base portion 124 extends between the first and second axial sides A1, A2 and defines a gas path on a radially inner side and a non-gas path on a radially outer side. In this disclosure, forward, aft, upstream, downstream, axial, radial, or circumferential is in relation to the engine axis A unless stated otherwise. The base portion 124 may extend axially forward and/or aft of the first and second walls 120, 122, and provides a surface for sealing of the BOAS first and second axial sides A1, A2. For example, the base portion 124 includes portions 129, 130 axially aft and forward, respectively, of the first and second walls 120, 122 for engagement with axial seals. That is, the walls 120, 122 extend less than the full length of the seal segment 105 in the axial direction.

The first wall 120 includes a first hook 126 and the second wall 122 includes a second hook 127. The hooks 126, 127 are configured to secure the seal segment 105 to the carrier 112. The hooks 126, 127 may provide a radially outermost portion of the seal segment 105. The hooks 126, 127 extend circumferentially inward towards one another. The hooks 126, 127 extend towards the matefaces, or first and second circumferential sides C2, C1, respectively. The hooks 126, 127 and walls 120, 122 generally form a "T" shape with protrusions 131, 133. The protrusion 133 is arranged radially outward of the protrusion 131. The protrusion 133 thus form an outer portion of a groove 132.

Figure 4:
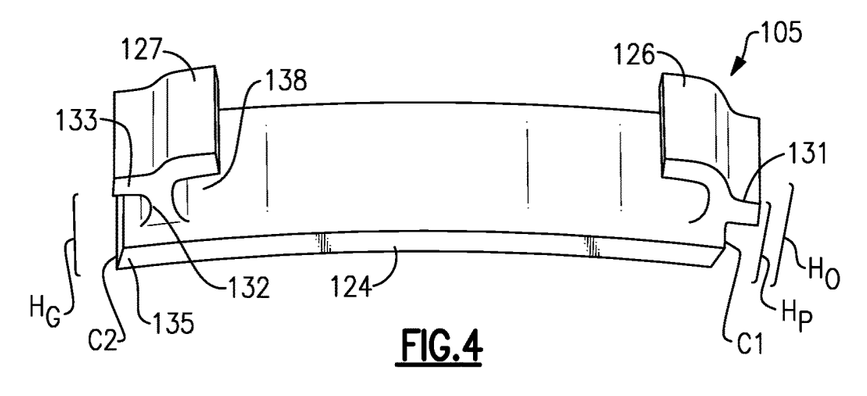
FIG. 4 shows the exemplary blade outer air seal.

As shown in FIG. 4, and with continuing reference to FIG. 3, the first and second circumferential sides C1, C2 are configured to mate with adjacent seal segments 105. In the illustrated example, the first circumferential side C1 of each seal segment 105 has a protrusion 131 extending circumferentially outward from the seal segment 105. The second circumferential side C2 of each seal segment 105 has a groove 132 extending circumferentially inward toward the seal segment 105. The groove 132 is formed by an inner portion 135 and an outer portion 133 of the second wall 122. In an embodiment, the inner portion 135 is a part of the base portion 124. The protrusion 131 of the seal segment 105 is configured to engage with the groove 132 of an adjacent seal segment 105. The protrusion 131 and groove 132 may extend along an axial length of the first and second walls 120, 122. The protrusion 131 and groove 132 form integral "shiplaps" that provide sealing between the first and second circumferential sides C1, C2 of each seal segment 105.

In one example, the protrusion 131 has a height Hp, and the groove 132 has a height HG. The height HG is greater than the height Hp. That is, the protrusions 131, 133 are arranged at different heights such that first and second circumferential sides C1, C2 can mate with adjacent seal segments 105. The first and second circumferential sides C1, C2 have a thickness Ho, which includes the inner and outer portions 135, 133, and the groove 132. The thickness Ho may be between about 0.04 and 0.15 inches (1.016-3.81 mm), for example.

Figure 5:
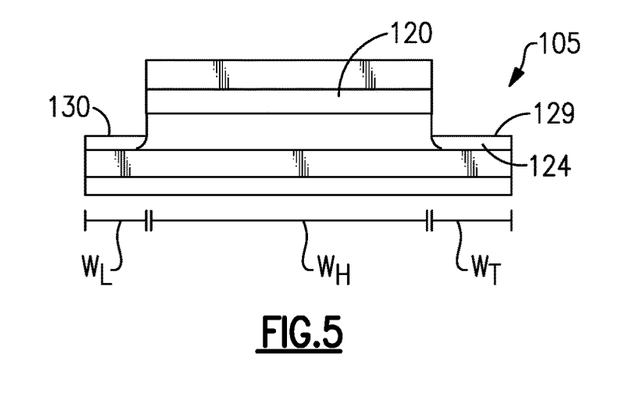
FIG. 5 shows a side view of the exemplary blade outer air seal.

FIG. 5 illustrates a side view of the seal segment 105. In some examples, the base portion 124 may extend radially forward and/or aft of the first and second walls 120. In the illustrated example, the first and second walls 120, 122 have a width $W_H$ in the axial direction. The base portion 124 extends axially forward to the first axial side A1 a distance $W_L$. The base portion 124 extends axially aft to the second axial side A2 a distance $W_T$. In some examples, the distances $W_L$ and $W_T$ are smaller than the width $W_H$. The distances $W_L$ and $W_T$ may be the same, or may be different, depending upon the sealing configuration at the leading and trailing edges. In one example, the distances $W_L$ and $W_T$ may be about 0.125 inches (3.175 mm). In another example, the distances $W_L$ and $W_T$ may be between about 0.0625 and 0.25 inches (1.588-6.35 mm).

The BOAS 106 may be formed of a ceramic matrix composite ("CMC") material. Each seal segment 105 is formed of a plurality of CMC laminates. The laminates may be silicon carbide fibers, formed into a braided or woven fabric in each layer. The fibers may be coated by a boron nitride. In other examples, the BOAS 106 may be made of a monolithic ceramic.

CMC components such as BOAS segments 105 are formed by laying fiber material, such as laminate sheets or braids, in tooling, injecting an infiltrant into the tooling, and curing to form a solid composite component. The component may be densified by adding additional material to further stiffen the laminates.

In an embodiment, the BOAS segment 105 is formed from fiber material such as silicon carbide (SiC) braids. In one example, the protrusion 131 and groove 132 are integrally formed from the construction. The protrusion 131 and groove 132 may be formed by wrapping braided plies about a mandrel, then pressing the laminates in the axial direction to form the protrusion 131 and groove 132 in one example. In another example, the protrusion 131 and groove 132 may be formed using inner and outer molds that form the protrusion 131 and groove 132.

Figure 6:
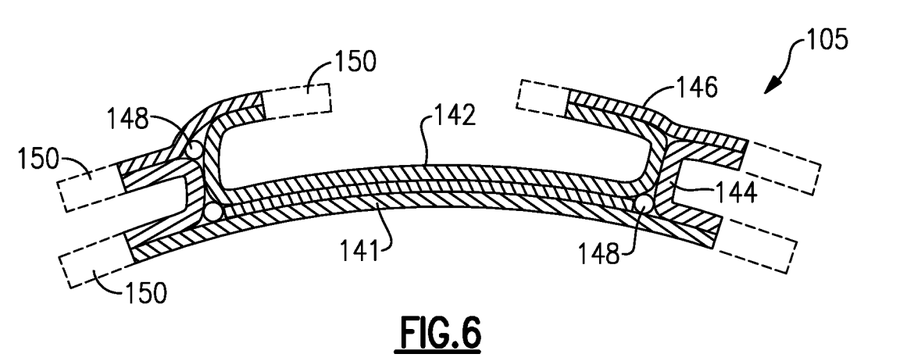
FIG. 6 shows a method step of forming a blade outer air seal.

FIG. 6 illustrates an example method of manufacturing the seal segment 105 such that the groove and protrusion are integral. An inner wrap 142 is formed about a mandrel from a plurality of plies 141. Additional plies 144 form the first and second circumferential sides. An outer wrap 146 joins the inner wrap 142 and the plies 144. In some examples, a filler 148 is used in spaces between the plies. The seal body may be machined to remove some portions 150 to arrive at the final seal segment 105. The seal body may be machined via ultrasonic machining, for example. The plies 141 may be 8-harness satin (8HS) weave, in some examples. In one example, the inner wrap 142 and plies 144 are formed from braided plies 141 wrapped around a mandrel, while the outer wrap 146 is formed from woven plies. The integral "shiplap" or "T" shaped hook arrangement provides for durable sealing between seal segments 105 in the final assembly 104.

Figure 7:
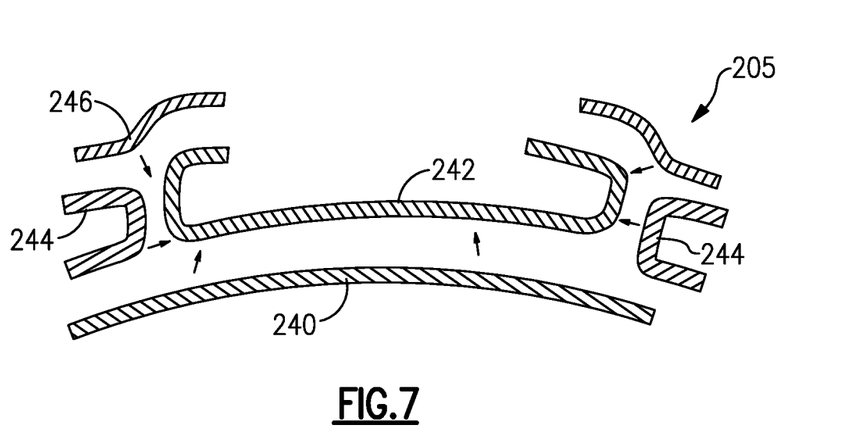
FIG. 7 shows a method step of forming a blade outer air seal.

FIG. 7 illustrates another example method of manufacturing a seal segment 205. In this example, individual ply stacks 242, 244 are formed before they are assembled together. The ply stacks 242, 244 may be formed around separate mandrels, then brought together and surrounded with outer wrap plies 246 to form a seal body. This example may require less machining of the seal body in some examples.

Figure 8:
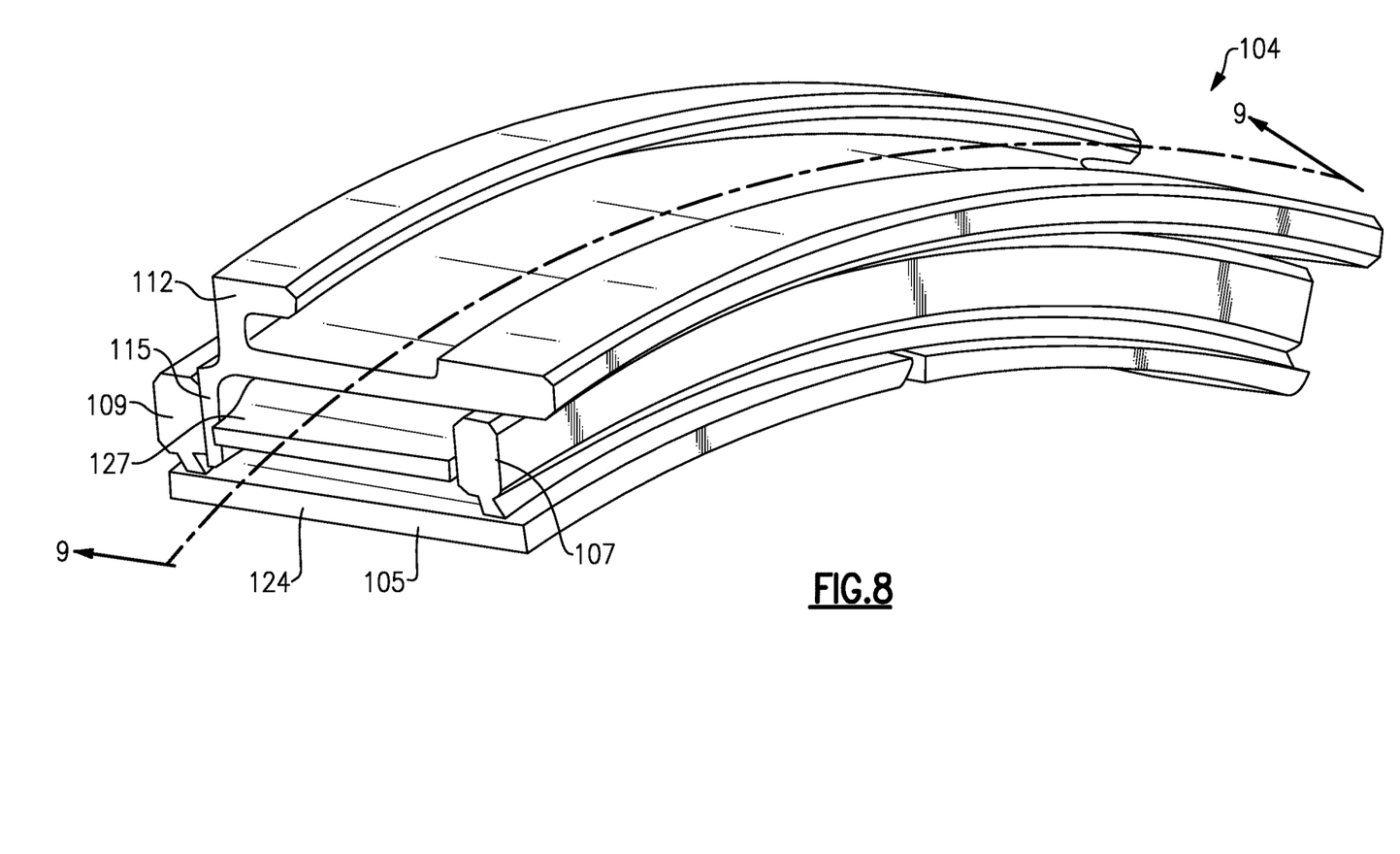
FIG. 8 shows a portion of an exemplary blade outer air seal assembly.

FIG. 8 shows a portion of an example BOAS assembly 104. The seal segments 105 are mounted in the carrier 112. In this example, a leading edge seal 109 is arranged near the leading edge of the seal segment 105 and a trailing edge seal 107 is arranged near the trailing edge. Although the illustrated seals 109, 107 are brush seals, the seals 109, 107 may be plate seals or another type of radial seal, for example. The brush seals 107, 109 engage the seal segment 105 and the carrier 112. The brush seals 107, 109 provide leading and trailing edge sealing for the BOAS 106. The brush seals 107, 109 seal with the seal segment 105 to form a cavity along the base portion 124 for cooling air. The brush seals 107, 109 may also help provide tailored BOAS supply pressure.

The carrier 112 has an integral radial pressure wall 115 that extends radially inward. In one embodiment, the radial wall 115 extends a circumferential width of the carrier 112. The radial wall 115 may be arranged between hooks 126, 127 on the seal segment 105 and the brush seal 109. The wall 115 may extend circumferentially from the hook 126 to the hook 127. The radial wall 115 may permit the assembly 104 to support axial loads from adjacent hardware, such as the vane 97 (shown in FIG. 2).

Figure 9:
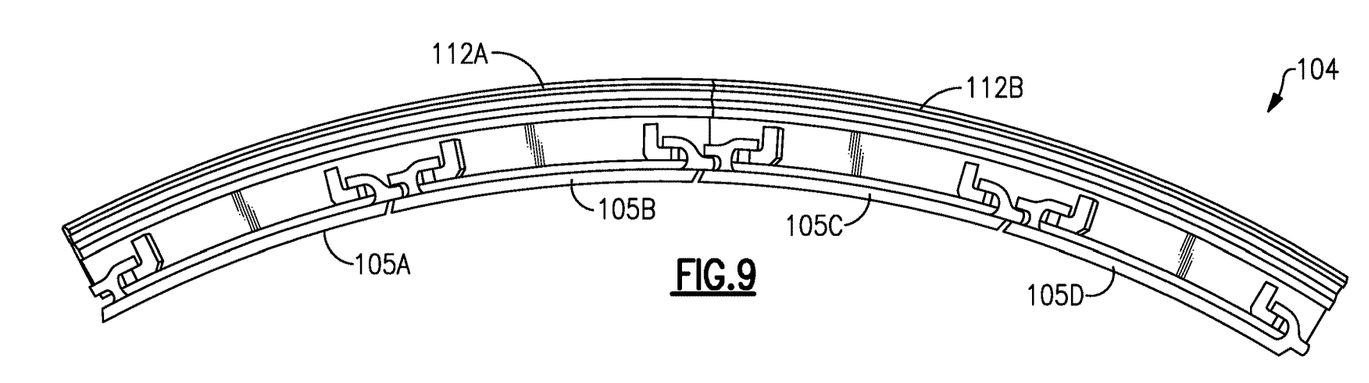
FIG. 9 shows a portion of the exemplary blade outer air seal assembly.

FIG. 9 shows a cross-sectional view of the portion of the example BOAS assembly 104 taken along line 9-9 of FIG. 8 The carrier 112 may be segmented into a plurality of segments 112A, 112B. In this example, each carrier segment 112A, 112B spans multiple BOAS segments 105A-D. Thus, there may be fewer carrier segments 112A, 112B than BOAS segments 105A-D in the assembly 104. In one example, a carrier segment 112A holds two BOAs segments 105A, 105B, and thus there are twice as many BOAS segments 105 as carrier segments 112. More or fewer carrier segments 112A, 112B may be used in the assembly 104. For example, in some embodiments, there may be the same number of carrier segments 112 as seal segments 105.

Figure 10:
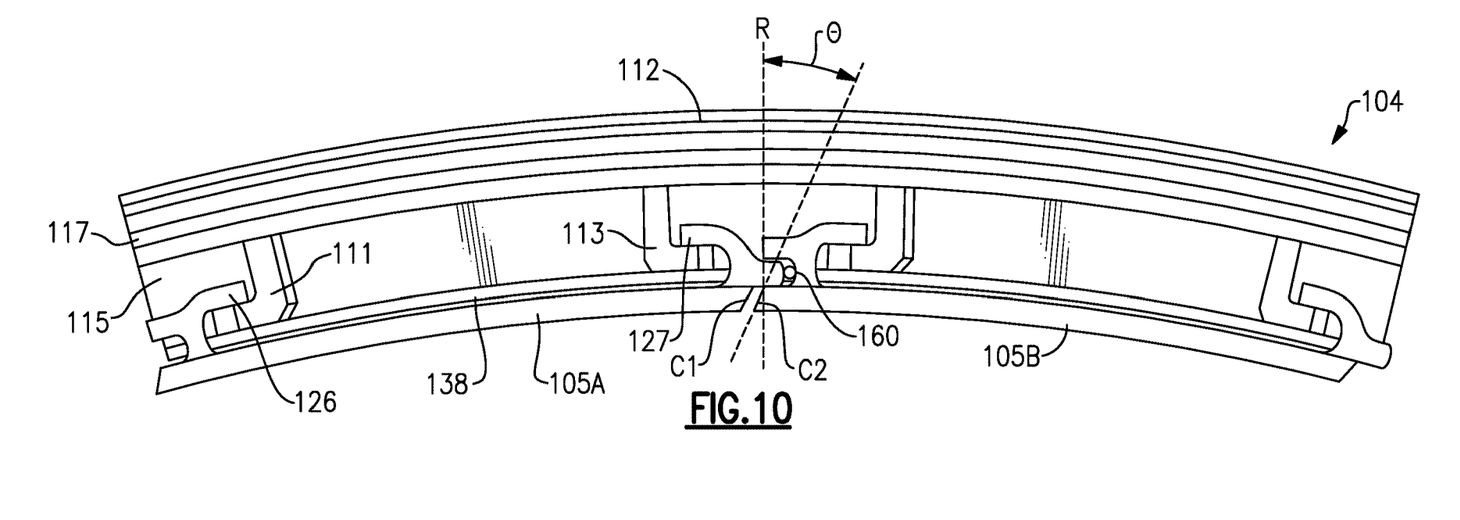
FIG. 10 shows a portion of the exemplary blade outer air seal assembly.

FIG. 10 shows a portion of the example BOAS assembly 104. The carrier 112 includes hooks 111, 113 that extend radially inward from an outer portion 117. The hooks 111, 113 may extend for an axial distance and join the wall 115. The hooks 111, 113 may join the wall 115 at a forward portion of the carrier 112. In one example, the hooks 111, 113 extend axially for most of an axial length of the hooks 126, 127. The hooks 111, 113 may extend for at least 90% of the axial length of the hooks 126, 127, for example. The axially extending hooks 111, 113 permit the seal segments 105 to be mounted axially into the carrier 112.

In some examples, the seal segments 105 have angled edges. In this example, first and second circumferential sides C1, C2 of the seal segments 105A, 105B are matefaces that are angled relative to the radial direction R. The matefaces have an angle θ that is configured to engage with a mateface of an adjacent seal segment. In one example, the angle θ is between about 5° and about 40°. In a further example, the angle θ is between about 5° and about 35°. The angle θ may be about 15°. In some examples, a rope seal 160 may be arranged between adjacent seal segments 105A, 105B. The rope seal 160 may be a linear rope seal that extends in the axial direction. The rope seal 160 may include a cobalt sheath, for example. In other examples, a different type of intersegment seal, such as a feather seal, may be arranged between adjacent seal segments 105A, 105B.

In some examples, a wear liner may be arranged between the seal segment 105 and the carrier 112. The wear liner may be a metallic material such as cobalt, for example. The wear liner may be formed from sheet metal.

Figure 11:
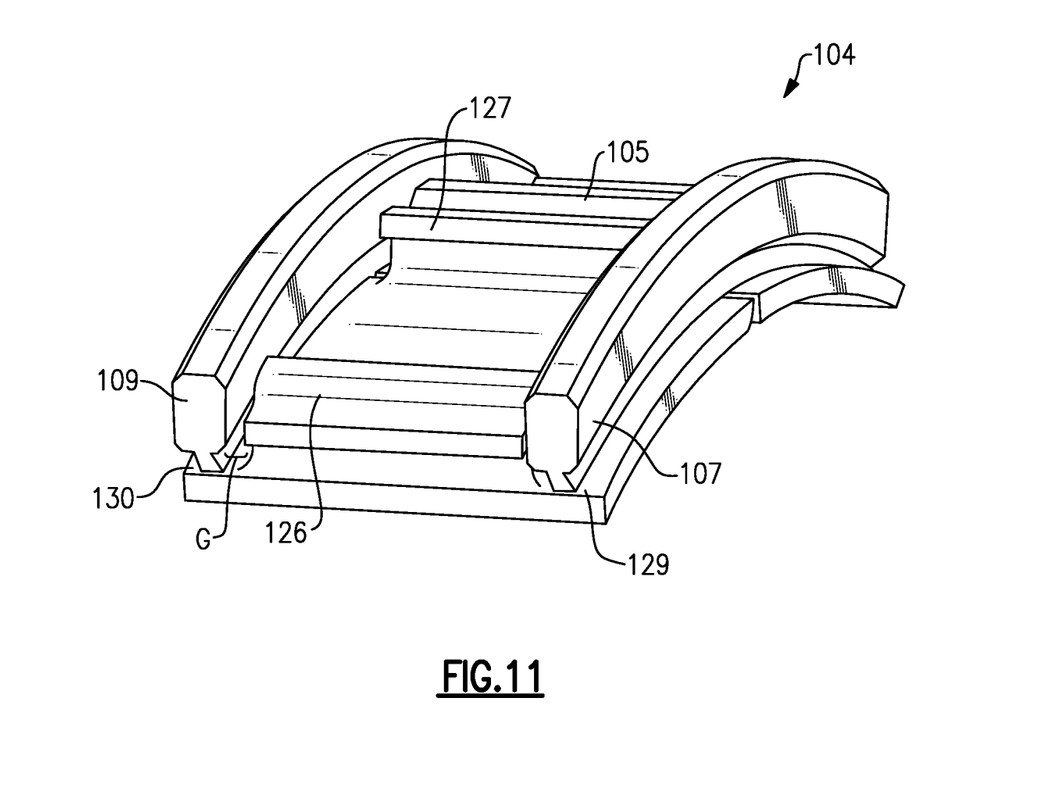
FIG. 11 shows a portion of the exemplary blade outer air seal assembly.

FIG. 11 shows a portion of the BOAS assembly 104. As can be seen, the forward portion 130 provides a platform for engagement with the brush seal 109. The aft portion 129 provides a platform for engagement with the brush seal 108. A gap G may be formed between the hooks 126, 127 and the brush seal 109. The gap G is sized to receive the wall 115 of the carrier 112. The wall 115 may help manage stresses on the seal segment 105.

The disclosed BOAS assembly 104 provides a simply supported BOAS architecture is compact in the radial direction, providing more space radially outward of the BOAS assembly 104. The disclosed BOAS assembly 104 having a radial pressure wall helps manage stresses on the BOAS. This is particularly helpful for distributing the high pressure loads and thermal uncurling for CMC BOAS applications. The protrusion and groove for mating adjacent seal segments 105 may accommodate a larger mateface gap between seal segments, which allows for thermal expansion mismatch with the carrier during engine operation.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal assembly, comprising:
   a blade outer air seal having a plurality of seal segments extending circumferentially about an axis and mounted in a support structure via a carrier; and
   wherein each of the seal segments has a base portion extending between a first circumferential side and a second circumferential side and from a first axial side to a second axial side, wherein a first and second hook extend along the base portion in an axial direction, the first and second hooks extend a hook distance in the axial direction, each base portion extends axially forward of the first and second hooks a forward distance and axially aft of the first and second hooks an aft distance, the forward and aft distances smaller than the hook distance, the first and second hooks engaged with the carrier, and wherein the carrier has a wall forward or aft of the first and second hooks and extending radially inward of the first and second hooks, wherein a radial brush seal is arranged at a leading edge of the blade outer air seal, and the wall is arranged between the radial brush seal and the first and second hooks.

2. The blade outer air seal assembly of claim 1, wherein the wall extends circumferentially between the first and second hooks.

3. The blade outer air seal assembly of claim 1, wherein the first circumferential side of each seal segment has a protrusion or a groove configured to mate with the second circumferential side of an adjacent seal segment.

4. The blade outer air seal assembly of claim 3, wherein each first circumferential side has a protrusion and each second circumferential side has a groove.

5. The blade outer air seal assembly of claim 3, wherein a rope seal is arranged between each of the plurality of seal segments.

6. The blade outer air seal assembly of claim 3, wherein a first edge of each first circumferential side and a second edge of each second circumferential side are angled relative to the radial direction.

7. The blade outer air seal assembly of claim 6, wherein the first and second edges have an angle between about 5° and 45°.

8. The blade outer air seal assembly of claim 1, wherein a second radial brush seal is arranged at a trailing edge of the blade outer air seal.

9. The blade outer air seal assembly of claim 1, wherein the wall is forward of the first and second hooks.

10. The blade outer air seal assembly of claim 1, wherein the carrier includes first and second carrier hooks engaged with the first and second hooks.

11. The blade outer air seal assembly of claim 10, wherein the first and second carrier hooks extend in the axial direction for at least 90% of the hook distance and the first and second carrier hooks join the wall.

12. The blade outer air seal assembly of claim 1, wherein the carrier comprises a plurality of carrier segments arranged circumferentially about the axis.

13. The blade outer air seal assembly of claim 12, wherein there are fewer carrier segments than seal segments.

14. The blade outer air seal assembly of claim 1, wherein the carrier is a metallic material.

15. The blade outer air seal assembly of claim 1, wherein the blade outer air seal is a ceramic material.

16. A turbine section for a gas turbine engine, comprising:
a turbine blade extending radially outwardly to a radially outer tip and for rotation about an axis of rotation;
a blade outer air seal having a plurality of segments mounted in a support structure via a carrier, the plurality of segments arranged circumferentially about the axis of rotation and radially outward of the outer tip;
at least one seal segment having a base portion extending between a first circumferential side and a second circumferential side and from a first axial side to a second axial side, a first hook extending from the base portion and circumferentially spaced from a second hook, the first and second hooks extending along an axial length of the base portion, wherein the first circumferential side has one of a protrusion and a groove, the first circumferential side configured to mate with the second circumferential side of an adjacent seal segment; and
wherein the carrier has a circumferential wall that extends radially inward of the first and second hooks.

17. The turbine section of claim 16, wherein the carrier is a metallic material.

18. The turbine section of claim 17, wherein the blade outer air seal is a ceramic material.

* * * * *